(No Model.) 2 Sheets—Sheet 1.
A. DAGRY.
DOUGH KNEADER OR MIXER.
No. 483,430. Patented Sept. 27, 1892.
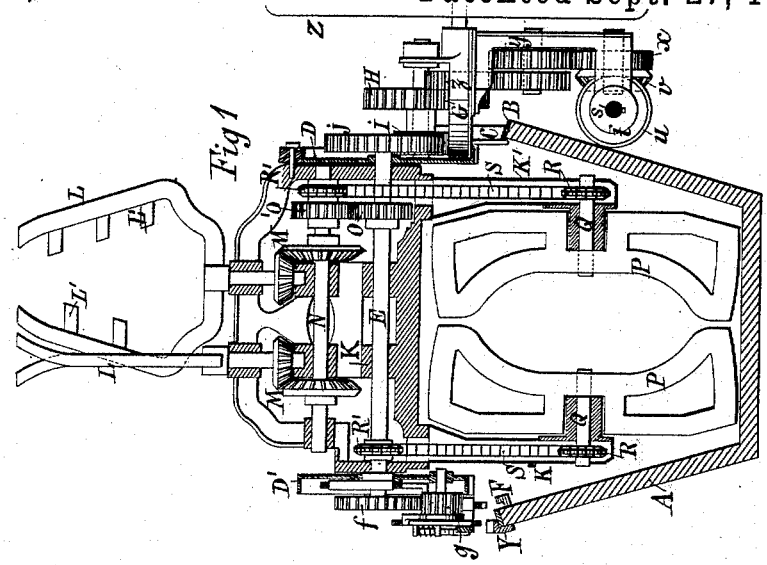
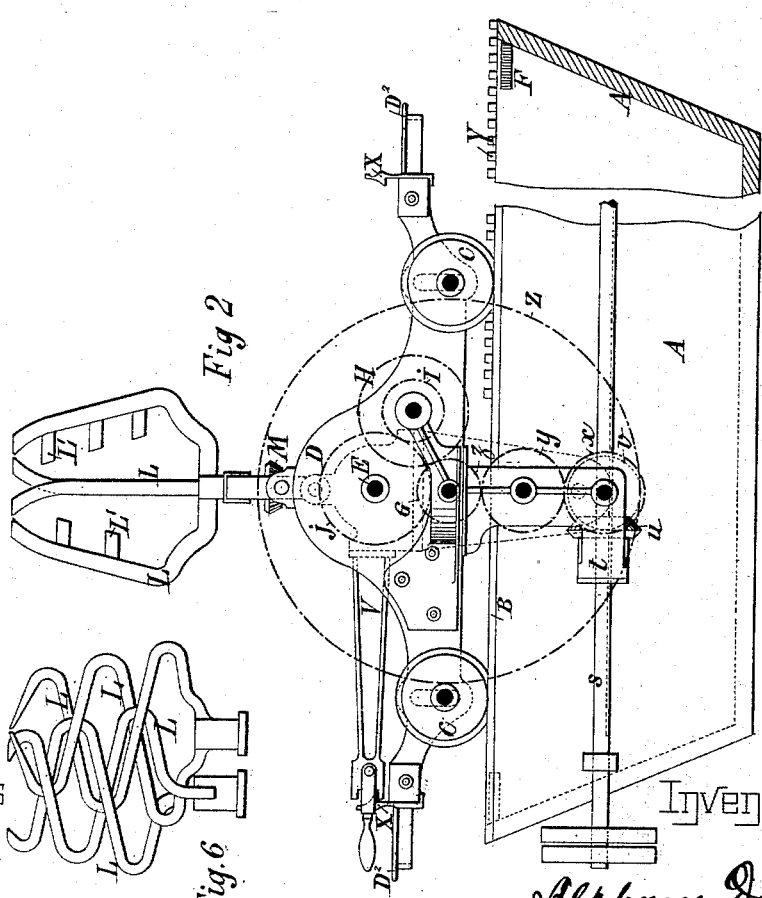
Witnesses
H. R. Kennedy
T. J. Elmore
Inventors
Alphonse Dagry
By Phil T. Dodge
Atty

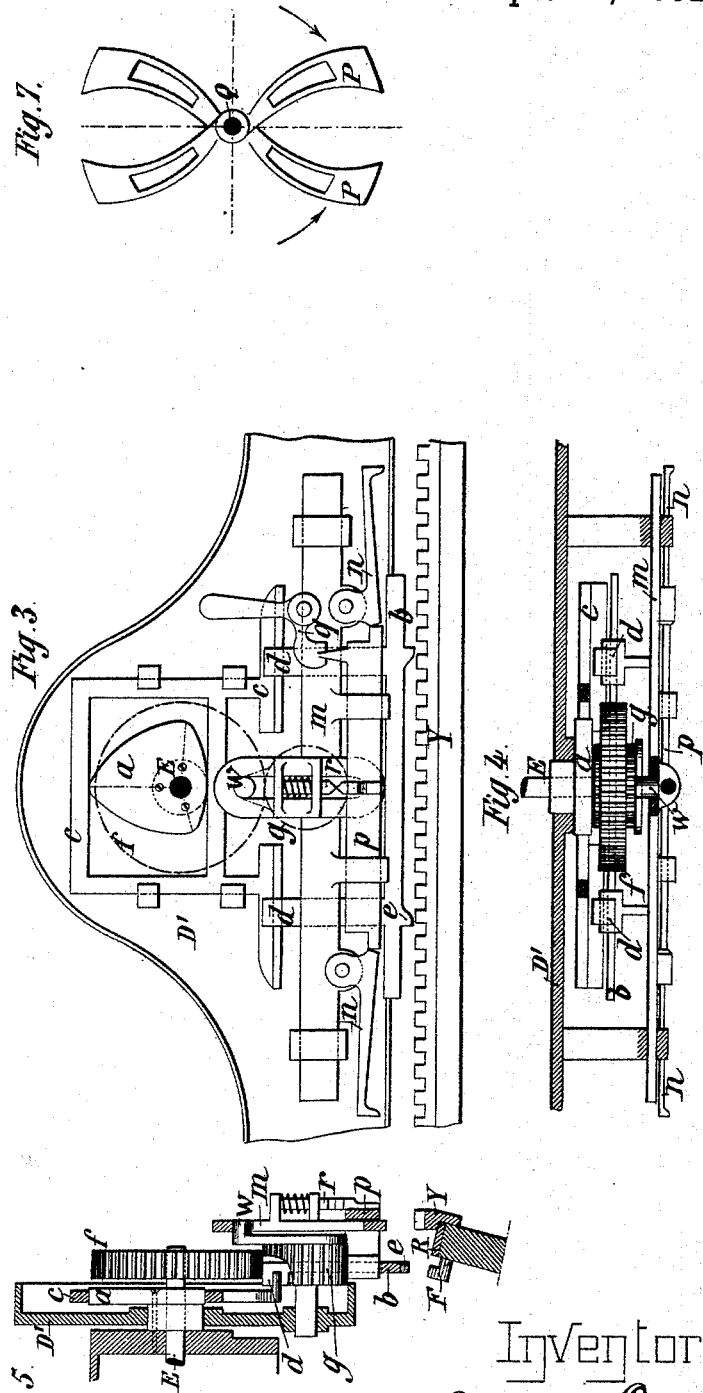

UNITED STATES PATENT OFFICE.

ALPHONSE DAGRY, OF PARIS, FRANCE, ASSIGNOR TO LA SOCIÉTÉ DAGRY & ARNAULT, OF SAME PLACE.

DOUGH KNEADER OR MIXER.

SPECIFICATION forming part of Letters Patent No. 483,430, dated September 27, 1892.

Application filed September 29, 1891. Serial No. 407,205. (No model.)

*To all whom it may concern:*

Be it known that I, ALPHONSE DAGRY, engineer, a citizen of the Republic of France, residing at Paris, in the Republic of France, have invented certain new and useful Improvements in Dough Kneaders or Mixers, of which the following is a specification.

This invention relates to that kind of kneading or mixing apparatus or machinery known as "mechanical kneaders" and which are intended to effect the kneading of the dough or paste, which is contained in a pan or trough, for the manufacture of bread.

It consists, essentially, of a framework which is chiefly intended to be placed on a rectangular trough of the shape of the usual bakers' kneading-troughs, and on the surface of which latter such apparatus or machine travels automatically, so as to progressively deal with the dough to be kneaded or worked.

This apparatus is composed, essentially, of two parts or elements arranged on one side and the other of the same axes, and around which latter such parts can oscillate, so as to alternately perform the two operations, which are usually done by the bakers' arms—that is to say, first of all the kneading operations, and then the drawing or pulling and the aeration one.

The invention relates, further, to various improved points in the construction and working of the various parts of the apparatus or mechanism.

The invention will now be described in detail, reference being made to the annexed drawings, in which—

Figure 1 is a transverse view, with parts in section, of the kneading-machine mounted on the trough. Fig. 2 is a lateral view taken from the driving side. Fig. 3 is a lateral view on a larger scale, showing the automatic traveling mechanism of the apparatus. Fig. 4 is a plan of this mechanism with the parts in section. Fig. 5 is a vertical section of this same mechanism. Fig. 6 is a view of a particular mechanical kneading apparatus fitted to the machine. Fig. 7 is a view of the part for pulling or aerating the paste represented separately.

The apparatus is mounted on a frame, hereinafter called the "traversing frame," the two sides D D' of which are connected at their extremities by cross-pieces $D^2$ $D^3$, so as to form a sort of carriage, which has fitted to it wheels C, whereby it can travel on rails B, fitted on the upper edges of a trough A, similar to the ordinary bakers' kneading-troughs. In the specimen shown as a sample in the drawings one of these sides D carries the driving-gear and the other D' carries the traversing mechanism; but it is easily seen that the whole of this mechanism could, if desired, be also arranged on one side of the apparatus. The two sides D D' of the frame carry a shaft or spindle E, hereinafter called the "motor-shaft," around which the two parts forming the kneader L and the puller or aerator P, which are both mounted on a common frame K K', hereinafter called the "revolving frame," can revolve or rock. The motor-shaft E also serves for conveying movement to these two parts and to the apparatus, so that an automatic movement of the kneading or mixing apparatus or machine on the trough will take place, as will be explained farther on.

As the kneader L and the puller P must work alternately, the revolving frame K K', carrying them, turns freely on the motor-shaft E, and such frame is fitted with a transverse arm V, Fig. 2, for oscillating it. Such arm is maintained in its two opposite positions by means of spring-clips X X, fitted to the extremity of the side D of the traversing frame."

*Kneader.*—On Figs. 1 and 2 this part is shown in its position when raised; but when it works it occupies a position so as to penetrate completely into the trough A. It is composed of two double branches L L, placed at right angles one to the other and fitted with transverse blades L'. These branches are bent up at their extremities, so as to stir up the material while the water and the flour are being mixed. The axes of these double branches are held in the part K of the oscillating revolving frame above mentioned and move in contrary directions by means of conical bevel-gearing M M, actuated by an intermediate shaft N, hereinafter called the "intermediate shaft," which is itself actuated by the motor-shaft E by means of cog-wheels O and O'. When hard dough or paste is to be kneaded or worked, this kneading-tool may be somewhat varied, as shown on Fig. 6, and its two branches L L assume the form of a helicoidal spiral. The two spirals forming one of the branches have a right-hand twist, while those of the other branch have a left-hand twist. In this manner these spiral blades by crossing one another and revolving in opposite directions penetrate without difficulty into the paste or dough and tend at all points to raise it toward the surface of the trough.

*Puller.*—The arrangement intended to draw or pull and aerate the dough is formed, as shown on the drawings, of two helical wings P P, placed symmetrically and revolving in a contrary direction, so as to draw or pull the dough between them and to raise it in order to aerate it and at the same time to cause it to slowly turn over on itself. These wings are mounted on independent axes Q and are held at the lower extremities of downwardly-extending branches K' of the revolving frame. These two independent axes have each a cog-wheel R, actuated by an endless chain S, which receives its motion from another cog-wheel R', and one of these cog-wheels R' is keyed on the motor-shaft E and the other is fixed on the intermediate shaft N and revolves in a contrary direction to the first one. This arrangement of the two helical wings P P has the advantage of avoiding any longitudinal reaction, which would tend to restrain the regular movement of the kneader on the trough A, as will be explained farther on.

*Automatic alternating traveling movement of the kneading or mixing apparatus.*—This movement is effected automatically and in an intermittent manner by means of the action of two catches $n$, hinged on a bar $m$, which latter has an alternating movement and gears with a ratchet Y, fitted on one of the upper edges of the kneading or mixing trough A, as seen in Figs. 1, 3, 4, and 5. For this purpose the bar $m$ is movable in fixed supports of the side D' of the traversing frame, and has a vertical groove, into which enters a cranked piece W, fitted to a gear-wheel $g$, which latter is actuated by a cog-wheel $f$, keyed on the above-named motor-shaft E. As only one of the aforesaid clips $n$ $n$ must work at a time, their heel-pieces are controlled by the extremities of a slide $p$, hereinafter called the "controlling-slide," against which they abut, and which controlling-slide is held in guide-supports fixed on the aforesaid alternately-moving bar $m$. The position of this controlling-slide on such bar is regulated by a spring-point $r$, which is fitted to the bar $m$, and which, according as it is placed on one side or the other of a beveled projection arranged in the middle of the slide $p$, maintains one or other of the engaging clips $n$ in a raised position. A handle $q$, having a hook, allows, when necessary, the controlling-slide $p$ to be stopped in the middle of its course, and when such is the case both of the two clips will be then raised, as shown in Fig. 3.

In order to produce the alternative movement of the kneading or mixing apparatus on the trough A, small projections F are fitted on the interior of the sides of the trough at its ends, and which, as will be seen farther on, force the controlling-slide $p$ to shift under the spring-point $r$, and consequently produce the alternation in the action of the engaging clips.

As the dimensions of the kneaders L and of the pulling and aerating wings P are different, the travel of the apparatus must vary according as one or the other of these parts is in action. For this purpose the controlling-slide $p$ comes under the influence of the small projections F just mentioned by means of a buttressed bar $b$, acting in the following manner.

On the external face of the revolving frame K K' a cam $a$ is fixed, through the center of rotation of which passes the motor-shaft E, and this cam is fixed in a rectangular frame $c$, capable of being raised or lowered in guides fixed on the side D' of the traversing frame. This rectangular frame is fitted at its lower part with small rails, on which extensions $d$, made in one piece with the buttressed bar $b$, may slide, and which extensions pass over the controlling-slide $p$ in order to carry it with them in their horizontal movement. The cam $a$ is of similar form to the bar $b$ and will be raised more or less, according as one or the other of the parts—that is, the kneader or the pulley—is lowered and brought into action or placed horizontally.

When the drawer or puller wings P are in action, the buttressed bar $b$ is lowered sufficiently for its extremities to encounter the small projections F on the inside of the trough, and when it is the kneader L which is in action it is the two small buttresses $e$, which are on the buttressed bar nearer the center of the same which encounter the projections. The traverse of the apparatus must then be greater in this latter case. Finally, when these two parts—that is, the kneader and the puller—are placed horizontally the buttressed bar $b$ will have reached its highest position, as shown in Fig. 3, and in this case the two catches $n$ $n$ being raised it is possible to freely move the apparatus on the trough A when the kneading of the paste has been completed.

*Method of actuating.*—When the apparatus has to be worked by hand, a fly-wheel Z, having a pinion G, which drives a wheel H, is made use of. The shaft of this wheel carries another pinion I, which finally actuates a cog-wheel J, keyed on the end of the motor-shaft E, as shown in Figs. 1 and 2 of the drawings hereto annexed. In this case the workman moves alternately in one direction or another along the trough A at the same time that he continues to revolve the fly-wheel Z always in the same direction. When the motion is to be supplied by a motor, a longitudinal shaft $s$, having a longitudinal groove serving to transmit the motion of the shaft to a sleeve $t$, is fitted on the trough A. This sleeve $t$ actuates bevel-gearing $u$ in connection with cog-wheels $v\ x$, whereby a pinion $z$, keyed on the spindle of the fly-wheel Z, is set in motion. It is understood that the bracket for the spindles of these latter cog-wheels $u\ v\ x\ y$ being invariably connected to the traversing frame D all the mechanism will travel along the trough at the same time as the apparatus, the sleeve $t$ on the longitudinal shaft $s$ receiving in all its positions the movement of such shaft in the groove of which it engages. Finally, it may be pointed out that the kneading-machine just described may, if necessary, be placed on a circular-cast trough, for instance, and which may have a circular rack on its upper part. In this case a single engaging catch will suffice, set in action by the fly-wheel Z, revolved by the workman, moving always in the same direction round the trough, all the parts of the mechanism relating to the reversal of the direction of the traveling motion of the apparatus and also to the automatic regulation of the extent of its course being dispensed with, and if the motion is to be transmitted mechanically to the kneader a slow movement in a circular direction on the trough may be given to it by means of a central shaft actuated by a motor. The circular rack arranged on the trough then serves to transmit the rotary motion to the shaft E, and consequently to the two parts the kneader L and the puller P, which are then capable of working alternately, as described above.

I declare that what I claim is—

1. In a kneading or mixing apparatus, a movable carriage on the surface of a fixed baker's trough, which carries two devices, one a kneader and the other a puller, mounted in opposite directions on a common frame, capable of oscillating round a shaft serving to transmit the movement to the whole apparatus, and which may be fixed in its two opposite positions in order to allow of these two parts working the paste successively in the whole length of the trough, substantially as described.

2. In a kneading or mixing apparatus, a kneading device composed of two similar branches, each formed of two shanks or blades twisted in opposite directions in the form of helicoidal spirals, these two branches being mounted parallel on shafts revolving in an opposite direction for the purpose of constantly turning over the dough into which they penetrate.

3. In a kneading or mixing apparatus mounted on a movable carriage on a fixed baker's trough, mechanism for automatically regulating the course of the carriage in accordance with the dimensions of the kneading and pulling devices, and which consists in the combination, with the slide-piece $p$, regulating the position of the drawing-catches, of a bar $b$, attached to this slide-piece and having buttressed projections $e$, separated at irregular distances and placed at different heights, the height of the said bar $b$ above the projections F being regulated by a frame $c$, which raises more or less a cam $a$, fixed to the oscillating frame K, as described above and shown.

4. In a kneading or mixing apparatus mounted on a movable carriage on a fixed trough, the combination of a frame, such as K, carrying the kneading and pulling devices and having an arm V, serving to cause it to oscillate around the main shaft E and to hold it in its two opposite positions by means of spring-catches X X, with an intermediate shaft N, revolving in the opposite direction to the shaft E and actuating on the one hand the two branches of the kneader L by means of opposed pinions M and on the other hand one of the branches of the puller P by means of an endless chain, the other branch of this device being actuated by the shaft E, also by means of an endless chain, as described above and shown.

In testimony whereof I have signed my name to this specification in the presence of two subscribing witnesses.

ALPHONSE DAGRY.

Witnesses:
   EUGENE DUMAS,
   CHARLES BAILLY, F.